United States Patent
Sugihara et al.

(10) Patent No.: US 7,480,594 B2
(45) Date of Patent: Jan. 20, 2009

(54) METHOD OF CALCULATING A WIRE PACKING DIAMETER, APPARATUS THEREFOR, AND PROGRAM THEREFOR

(75) Inventors: Kokichi Sugihara, Bunkyo-ku (JP); Masayoshi Sawai, Kosai (JP)

(73) Assignee: Yazaki Corporation, Tokyo (JP)

( * ) Notice: Subject to any disclaimer, the term of this patent is extended or adjusted under 35 U.S.C. 154(b) by 383 days.

(21) Appl. No.: 10/522,902

(22) PCT Filed: Aug. 1, 2003

(86) PCT No.: PCT/JP03/09821

§ 371 (c)(1),
(2), (4) Date: Oct. 19, 2005

(87) PCT Pub. No.: WO2004/013778

PCT Pub. Date: Feb. 12, 2004

(65) Prior Publication Data

US 2006/0096372 A1    May 11, 2006

(30) Foreign Application Priority Data

Aug. 2, 2002 (JP) ............................. 2002-225860

(51) Int. Cl.
*G06F 17/50* (2006.01)

(52) U.S. Cl. .............................. 703/1; 269/329; 264/136

(58) Field of Classification Search ...................... 703/1, 703/6; 269/329; 49/502; 16/2.5; 174/72 A, 174/68.3; 307/10.1; 29/872; 264/136

See application file for complete search history.

(56) References Cited

U.S. PATENT DOCUMENTS 5,940,962 A * 8/1999 Shima et al. .................. 29/825

(Continued)

FOREIGN PATENT DOCUMENTS

EP           0 718 597 A        6/1996

(Continued)

OTHER PUBLICATIONS

Sugihara K: "Estimation of the Sizes of Wire Bundles in Manufacturing" Mathematical Methods in Manufacturing and Logistics, 'Online! vol. 54, No. 2001, Dec. 16, 2001, p. 14, XP002285233 Mathematisches Forschungsinstitut Oberwolfach Retrieved from the Internet: URL : www.mfo.de/programme/schedule/2001/51/Report_54_01.ps> 'retrieved on Jun. 18, 2004! p. 14.

(Continued)

*Primary Examiner*—Kandasamy Thangavelu
(74) *Attorney, Agent, or Firm*—Sughrue Mion, PLLC

(57) ABSTRACT

To provide an effective calculation method and an apparatus therefor for obtaining an outside diameter of a wire packing by bundling and packing a plurality of wires into the smallest possible circular shape. The outside diameter of a wire harness surrounding a plurality of wires is efficiently obtained by repeatedly calculating an operation in which the layout of the plurality of wires making up the wire harness is changed such that, by using a computer, the wires are moved as distantly as possible from the wire protruding from an including circle, and the protruding wire is inserted in a space thus created. In particular, by adopting the concept of a circular Voronoi diagram, it becomes possible to obtain the outside diameter of the wire harness extremely simply and in a short time.

8 Claims, 8 Drawing Sheets

U.S. PATENT DOCUMENTS

| | | | | |
|---|---|---|---|---|
| 6,017,176 | A | * | 1/2000 | Marui .......................... 411/82 |
| 6,051,789 | A | * | 4/2000 | Kato .......................... 174/68.3 |
| 6,330,746 | B1 | * | 12/2001 | Uchiyama et al. ............. 29/872 |
| 6,429,544 | B1 | * | 8/2002 | Sasaki et al. ................ 307/10.1 |
| 6,610,929 | B1 | * | 8/2003 | Motokawa ................ 174/72 A |
| 2001/0044984 | A1 | * | 11/2001 | Ono et al. ..................... 16/2.5 |
| 2001/0052203 | A1 | * | 12/2001 | Doshita et al. ................ 49/502 |
| 2003/0006523 | A1 | * | 1/2003 | Suzuki ....................... 264/136 |
| 2003/0030206 | A1 | * | 2/2003 | Masukawa et al. .......... 269/329 |
| 2005/0150680 | A1 | * | 7/2005 | Sugihara et al. .......... 174/128.1 |
| 2005/0197810 | A1 | * | 9/2005 | Sugihara et al. ................ 703/6 |

FOREIGN PATENT DOCUMENTS

| | | |
|---|---|---|
| JP | 06-47396 U | 6/1994 |
| JP | 09-237531 A | 9/1997 |
| JP | 2002-056040 A | 2/2002 |

OTHER PUBLICATIONS

Huang et al: "Local Search Based on a Physical Model for Solving a Circle Packing Problem" MIC 2001 4th Metaheuristics Conference, Jul. 16, 2001, pp. 455-459, XP002285969 Porto, Portugal p. 455 p. 457-p. 458.

Database Inspec 'Online! The Institution of Electrical Engineers, Stevenage, GB; 1998, Arai M et al: "Packing circles under variable spatial constraints: a vibration control approach" XP002287151 Database accession No. 6710347 abstract & Intelligent Autonomous Systems. IAS-5, Intelligent Autonomous Systems. IAS-5, Sapparo, Japan, 1998, pp. 727-734, Amsterdam, Netherlands, IOS Press, Netherlands ISBN: 90-5199-398-6.

Deok-Soo Kim et al: "Robust and fast algorithm for a circle set Voronoi diagram in a plane" 2001, Berlin, Germany, Springer-Verlag, Germany, May 2001, pp. 718-727, XP002285235 ISBN: 3-540-42232-3 the whole document.

Deok-Soo Kim, et al., "Voronoi diagram of a circle set from Voronoi diagram of a point set: II. Geometry", Computer Aided Geometric Design, 18, (2001) 563-585.

Deok-Soo Kim, et al., "Voronoi diagram of a circle set from Voronoi diagram of a point set: I. Topology", Computer Aided Geometric Design, 18, (2001), 541-562.

Mathematical Methods in Manufacturing and Logistics, vol. 54, 2001, p. 1-21, Mathematisches Forschungsinstitut Oberwolfach.

* cited by examiner

METHOD OF CALCULATING A WIRE PACKING DIAMETER, APPARATUS THEREFOR, AND PROGRAM THEREFOR

TECHNICAL FIELD

The present invention relates to a method of and an apparatus for calculation for obtaining an outside diameter of a wire packing by bundling and packing a plurality of wires into the smallest possible circular shape by using a computer.

BACKGROUND ART

A wire-like structure called a wire harness, which is formed by bundling a plurality of wires such as electrical wires for electrically connecting electronic equipment, electronic components, and the like, is routed in a vehicle or a building structure. In recent years, from the viewpoint of improvement of space efficiency and the like, such a wire harness has come to be required to be as compact as possible without causing a decline in electric characteristics. In consequence, there is a need to calculate the outside diameter of the wire harness more accurately. Conventionally, however, that calculation is conventionally performed by experience or a method of calculation shown below, and particularly effective calculation method has not been proposed.

Referring to FIGS. 8A and 8B, a problem in the conventional method of calculating the outside diameter of a wire harness will be described. FIG. 8A shows a wire harness which is made up of a relatively small number of wires, and FIG. 8B shows a wire harness which is made up of a relatively large number of wires.

In the conventional method of calculation, as shown in FIG. 8A, when n wires $a_1$ are given, the cross section of these wires $a_1$, or a wire harness 10 consisting of these wires $a_1$, is assumed to be circular. A diameter L of the wire harness 10 consisting of these wires $a_1$ is determined on the basis of the formula:

$$\pi L^2/4 = K\Sigma(\pi l_i^2/4)$$

Here, $l_i$ denotes the diameter of the wire $a_1$, and K denotes a gap coefficient. Since it is difficult to determine respective gap coefficients in such a manner as to fit the number and layout of various wires, a fixed value is always used for all the cases irrespective of the number and layout of wires making up the wire harness 10.

However, as shown in FIGS. 8A and 8B, even in the case of the wire harnesses having equal diameters L, it is evident that areas of their gaps 11 and 11' differ depending on the number and layout of the wires $a_1$ and $a'_1$ making up the respective wire harnesses. If that diameter L is nevertheless determined by always using the gap coefficient K of a fixed value in the above-described manner, that value becomes inaccurate, so that this method has been impractical.

Thus, there has been no practical method for determining the outside diameter of a wire harness which is made up of an arbitrary number of wires. It goes without saying that there has been no effective method of calculation for obtaining the outside diameter of the wire harness when the wires are bundled and packed into the smallest circular form possible.

DISCLOSURE OF THE INVENTION

Accordingly, in view of the above-described circumstances, an object of the invention is to provide an effective method of calculation for obtaining an outside diameter of a wire packing by bundling and packing an arbitrary number of wires into the smallest possible circular shape, an apparatus and a program therefor.

To attain the above object, in accordance with a first aspect of the invention there is provided a method of calculating a wire packing for obtaining an outside diameter thereof by bundling and packing a plurality of wires into the smallest possible circular shape so as not to overlap each other by using a computer, characterized by comprising: an including-circle assuming step of assuming an including circle which includes a plurality of circles arranged in a plane so as not to overlap each other by assuming that cross-sectional shapes of the plurality of wires are the plurality of circles having diameters corresponding to respective outer shapes thereof; a target-circle defining step of determining a target circle which has the same center as that of the including circle and is slightly smaller than the including circle, and from which at least one of the plurality of circles protrudes; a searching step in which the circle protruding from the target circle is set as an insertion trial circle, and positions are searched to which the plurality of circles other than the insertion trial circle can be moved as distantly as possible within the target circle without overlapping each other; an inserting step of inserting the insertion trial circle in a space in the target circle created by changing the layout of the plurality of circles on the basis of a result of search in the searching step; and a first search controlling step in which in a case where all the insertion trial circles have been inserted in the target circle, a new target circle which is slightly smaller than a present one and has the insertion trial circle is set, and the operation returns to the searching step, wherein the including circle is made gradually small by repeatedly executing the target-circle defining step, the searching step, the inserting step, and the first search controlling step.

In accordance with the above-described first aspect of the invention, the including circle surrounding the plurality of wires is made gradually small by repeatedly executing the target-circle defining step, the searching step, the inserting step, and the first search controlling step by using a computer. Consequently, the outside diameter of the circle surrounding the plurality of wires is obtained efficiently.

The method of calculating a wire packing in accordance with a second aspect of the invention devised to attain the above object is characterized in that, in the method of calculating a wire packing according to the first aspect, in the searching step, a circle Voronoi diagram is constructed by a circle set excluding the insertion trial circle and one of the plurality of circle, and the target circle, and an examination is made with respect to the plurality of circles other than the insertion trial circle as to whether or not a center of the one circle tangent to both side circles forming each of boundary edges in the circle Voronoi diagram is located on the boundary edge, to thereby search positions to which the circles can be moved within the target circle.

In accordance with the above-described second aspect of the invention, the search of movement candidate positions of the insertion trial circle is extremely simplified by making use of a circle Voronoi diagram.

In the method of calculating a wire packing in accordance with a third aspect of the invention devised to attain the above object, the method of calculating a wire packing according to the first or second aspect is characterized by further comprising: a second search controlling step which is repeatedly executed together with the target-circle defining step, the searching step, the inserting step, and the first search controlling step, and in which in a case where the insertion of the insertion trial circle is impossible, the operation returns to the searching step after determining a new target circle which is of an intermediate size between the including circle and the present target circle and which has the insertion trial circle.

In accordance with the above-described third aspect of the invention, a second search controlling step is further comprised in which in a case where the insertion of the insertion trial circle is impossible, the operation returns to the searching step after determining a new target circle which is of an intermediate size between the including circle and the present target circle. Consequently, the outside diameter of the circle surrounding the plurality of wires is obtained more efficiently.

To attain the above object, in accordance with a fourth aspect of the invention there is provided an apparatus for calculating a wire packing for obtaining an outside diameter thereof by bundling and packing a plurality of wires into the smallest possible circular shape so as not to overlap each other, characterized by comprising: including-circle assuming means for assuming an including circle which includes a plurality of circles arranged in a plane so as not to overlap each other by assuming that cross-sectional shapes of the plurality of wires are the plurality of circles having diameters corresponding to respective outer shapes thereof; target-circle defining means for determining a target circle which has the same center as that of the including circle and is slightly smaller than the including circle, and from which at least one of the plurality of circles protrudes; searching means in which the circle protruding from the target circle is set as an insertion trial circle, and positions are searched to which the plurality of circles other than the insertion trial circle can be moved as distantly as possible within the target circle without overlapping each other; inserting means for inserting the insertion trial circle in a space in the target circle created by changing the layout of the plurality of circles on the basis of a result of search by the searching means; first search controlling means in which in a case where all the insertion trial circles have been inserted in the target circle, a new target circle which is slightly smaller than a present one and has the insertion trial circle is set, and the search by the searching means is then effected; input means for inputting initial information on the plurality of wires; and output means for outputting at least the outside diameter of the including circle.

In accordance with the above-described fourth aspect of the invention, initial information on the plurality of wires is inputted by the input means, the including circle surrounding the plurality of wires is made gradually small by the target-circle defining means, the searching means, the inserting means, and the first search controlling means, and the outside diameter of that including circle is outputted by the output means. Consequently, the outside diameter of the circle surrounding the plurality of wires is obtained efficiently.

The apparatus for calculating a wire packing in accordance with a fifth aspect of the invention devised to attain the above object is characterized in that, in the apparatus for calculating a wire packing according to the fourth aspect, the output means outputs position information on the including circle and the plurality of circles.

According to the above-described fifth aspect of the invention, since the position information on the including circle and the plurality of circles is outputted, the outside diameter of the circle surrounding them, including the layout of the plurality of wires, is obtained efficiently.

The apparatus for calculating a wire packing in accordance with a sixth aspect of the invention devised to attain the above object is characterized in that, in the apparatus for calculating a wire packing according to the fourth or fifth aspect, the searching means includes second searching means in which a circle Voronoi diagram is constructed by a circle set excluding the insertion trial circle and one of the plurality of circle, and the target circle, and in which an examination is made with respect to the plurality of circles other than the insertion trial circle as to whether or not a center of the one circle tangent to both side circles forming each of boundary edges in the circle Voronoi diagram is located on the boundary edge, to thereby search positions to which the circles can be moved within the target circle.

In accordance with the above-described sixth aspect of the invention, the search of movement candidate positions of the insertion trial circle is extremely simplified by making use of a circle Voronoi diagram in the second searching means.

In the apparatus for calculating a wire packing in accordance with a seventh aspect of the invention devised to attain the above object, the apparatus for calculating a wire packing according to any one of fourth, fifth, and sixth aspects is characterized by further comprising: second search controlling means which, in a case where the insertion of the insertion trial circle is impossible, causes the search by the searching means to be effected after determining a new target circle which is of an intermediate size between the including circle and the present target circle and which has the insertion trial circle.

In accordance with the above-described seventh aspect of the invention, in a case where the insertion of the insertion trial circle by the second search controlling means is impossible, the search by the searching means is effected again after determining a target circle which is of an intermediate size between the including circle and the present target circle. Therefore, the outside diameter of the circle surrounding the plurality of wires is obtained more efficiently.

BEST MODE FOR CARRYING OUT THE INVENTION

Referring now to the accompanying drawings, a description will be given of an embodiment of the invention.

Figure 1:
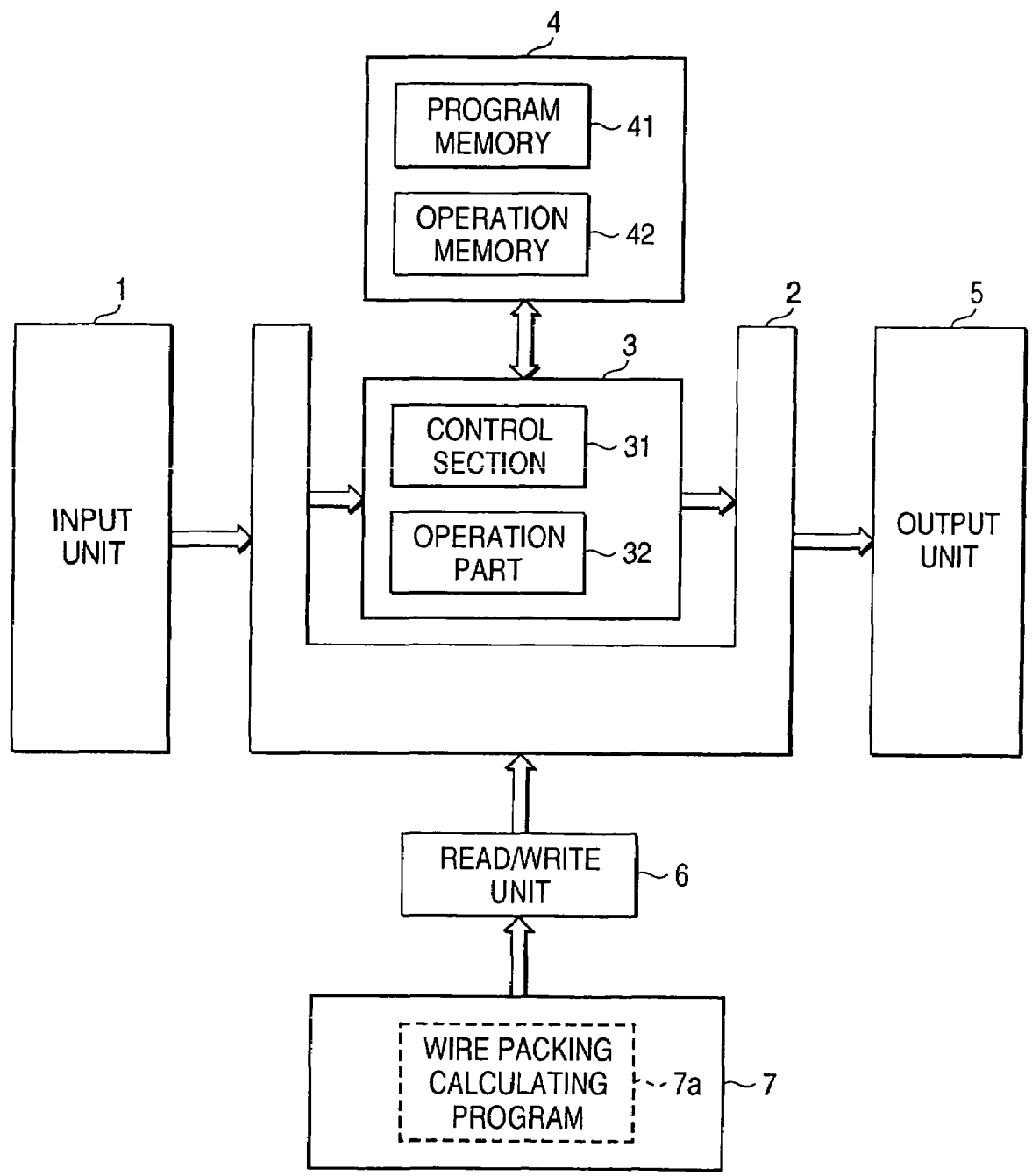
FIG. 1 is a block diagram illustrating an example of a hardware configuration for realizing a calculation method and an apparatus therefor in accordance with the invention.

First, referring to FIG. 1, a description will be given of a hardware configuration for realizing a method of calculating a wire packing. FIG. 1 is a block diagram illustrating an example of a hardware configuration for realizing a calculation method and an apparatus therefor in accordance with the invention.

As shown in FIG. 1, the hardware configuration is realized by a known personal computer, a general-purpose computer, or the like. This computer is comprised of an input unit 1, an input/output interface circuit (I/O) 2, a central processing unit (CPU) 3, a memory 4, an output unit 5 and a read/write unit 6. The input unit 1, the memory 4, the output unit 5 and the read/write unit 6 are electrically connected to the CPU 3 through the I/O 2 and the like.

The input unit 1 is, for example, a keyboard and a mouse device which are used for inputting input data in processing which will be described later. The CPU 3 includes a control section 31 for controlling the input unit 1, the output unit 5, and the like, as well as an operation part 32 for effecting processing concerning the calculation method, which will be described later, in accordance with programs stored in the memory 4.

The memory 4 includes a program memory 41 for storing programs and the like corresponding to each processing in accordance with the calculation method which will be described later, as well as an operation memory 42 to which work areas for various processing to be performed by the CPU 3 are allotted. The output unit 5 is, for example, a monitor display and a printer for outputting the results of processing performed by the CPU.

The read/write unit 6 is a device which reads out a wire packing calculating program 7a according to the present invention which stored in a recording medium 7 such as CD-ROM (for example, a program for processing procedures shown in FIGS. 2, 4, 5 and 6 described later), and transmits it to the program memory 41. The read/write unit 6 has a function of writing the calculation result in the recording medium 7. Incidentally, the computer may includes a communication interface such as not-shown modem board and LAN card.

The CPU 3 installs the wire packing calculating program 7a read out by the read/write unit 6 in a program memory 41 of the memory 4. After power the computer on, the program 7a is executed and the computer functions as the apparatus for calculating the wire packing. The wire packing calculating program 7a is capable of being installed in, for example, a personal computer and general-purpose computers having the above construction, and when the program is installed, the computer functions as the apparatus for calculating the wire packing.

The wire packing calculating program 7a may be provided not only through the recording medium such as CD-ROM but also through a communication lint such as Internet, dedicated line and LAN, for example.

Figure 2:
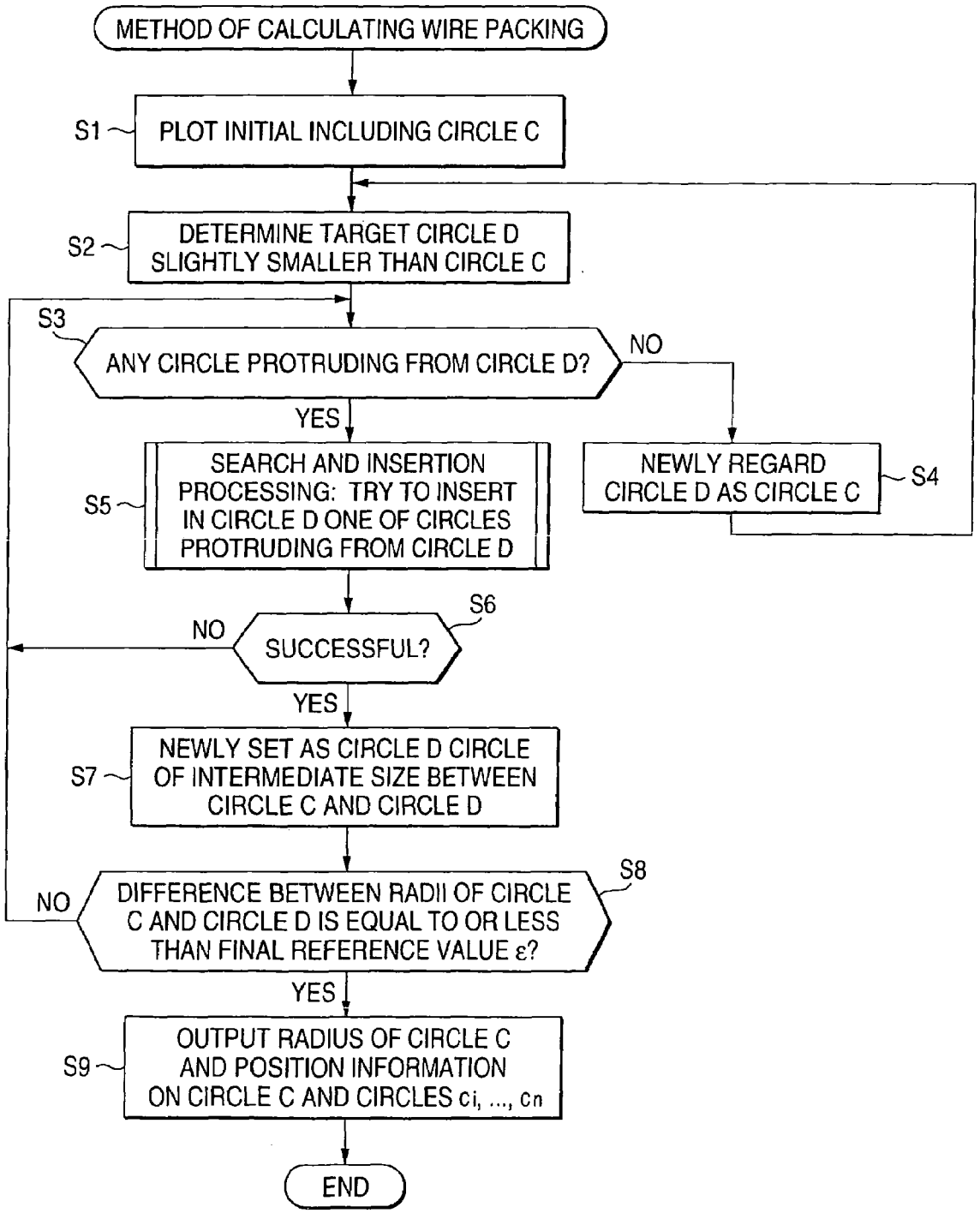
FIG. 2 is a flowchart illustrating a basic processing procedure in accordance with an embodiment of the calculation method of the invention.

Next, referring to FIGS. 2 to 7, a description will be given of a processing procedure concerning an embodiment of the calculation method in accordance with the invention. Accordingly, referring to FIG. 2, a description will be first given of a basic processing procedure of this calculation method. FIG. 2 is a flowchart illustrating a basic processing procedure in accordance with an embodiment of the calculation method of the invention.

In this calculation method, the problem resolves itself into one in which cross-sectional shapes of a plurality of wires making up the wire harness are assumed to be a plurality of circles having diameters corresponding to the respective outer shapes thereof, and when n circular cylinders having these circles in their cross sections are bundled, the size of a circle capable of surrounding and accommodating the overall circles is examined. In practice, an effective calculation method is conceived for bundling and packing a plurality of wires into the smallest possible circular shape and for obtaining its outside diameter.

In the basic processing shown in FIG. 2, radii $r_1, r_2, \ldots, r_n$ of n circles $c_1, c_2, \ldots, c_n$ whose outer shapes respectively correspond to cross-sectional shapes of a plurality of wires such as electric wires making up the wire harness, a number p which is smaller than and sufficiently close to 1, e.g., p=0.95, a terminating reference value $\epsilon$ which is a sufficiently small integer, e.g., the terminating reference value $\epsilon$=min (($r_1, r_2, \ldots, r_3$)/100) are given as input information.

In addition, a radius R of the smallest possible circle for packing the n circles $c_1, c_2, \ldots, c_n$ so as not to overlap each other, as well as position information on a circle C and the circles $c_1, c_2, \ldots, c_n$ at this time are given as the output information.

For this reason, in Step S1 shown in FIG. 2, the circles $c_1, c_2, \ldots, c_n$ are laid out in a plane so as not to overlap each other, and a large circle surrounding them, i.e., an including circle C, is found.

Next, in Steps S2, S3, and S4, a circle which has the same center as that of the aforementioned including circle C and whose radius is p-fold that of the including circle C, i.e., a target circle D, is determined. Namely, in a loop consisting of Steps S2, S3, and S4, a target circle D is determined which has the same center as that of the including circle C and is slightly smaller than the including circle C, and from which at least one of the plurality of circles $c_1, c_2, \ldots, c_n$ protrudes. It should be noted that, in the following processing steps, the layout is changed so that the circles $c_1, c_2, \ldots, c_n$ are accommodated in the target circle D.

Next, in Step S5, search and insertion processing is effected. Namely, here, circles other than an arbitrary circle $c_i$ protruding from the target circle D are removed in order starting with one whose distance from the circle $c_1$ is largest. Those circles which can be placed at farther positions are moved as distantly as possible, and when such movement is impossible, the circles are left at the present positions. Then, an attempt is made to move the single circle $c_1$ to a space created by such movement, i.e., an insertion is attempted. It should be noted that the processing of this Step S3 will be described later with reference to FIGS. 4 to 7.

Next, in Step S6, a determination is made as to whether or not the insertion of the circle $c_i$ has been successful in Step S5 above. If successful (Y in Step S6), the operation returns to Step S3, and if not (N in Step S6), the operation proceeds to Step S7. When the operation returns to Step S3, a determination is made as to whether or not there is any other protruding circle. If there is, the search and insertion processing in Step S5 is effected again with respect to this protruding circle. If there is not, the operation proceeds to Step S4 to effect the same processing as described above.

Meanwhile, in Step S7, a circle of an intermediate size between the aforementioned including circle C and the aforementioned target circle D for which the insertion was unsuccessful is newly set as the target circle D. Next, in Step S8, a determination is made as to whether the difference between the radii of the including circle and the target circle D used in the processing in Step S7 above is equal to or less than the aforementioned terminating reference value $\epsilon$. If this difference is greater than the terminating reference value $\epsilon$ (N in Step S8), the operation returns to Step S3 to repeat the same processing as described above, whereas if this difference is equal to or less than the terminating reference value $\epsilon$ (Y in Step S8), the operation proceeds to Step S9.

In Step S9, the radius of this including circle C is outputted to the output unit 5 as the final radius R of the wire harness. In addition, the position information on the circle C and the circles $c_1, c_2, \ldots, c_n$ at this time are also outputted to the output unit 5. These outputs may be given on a monitor display or may be printed out on paper. It should be noted that the aforementioned number p and terminating reference value $\epsilon$ may be slightly changed, as required.

Figure 3A:
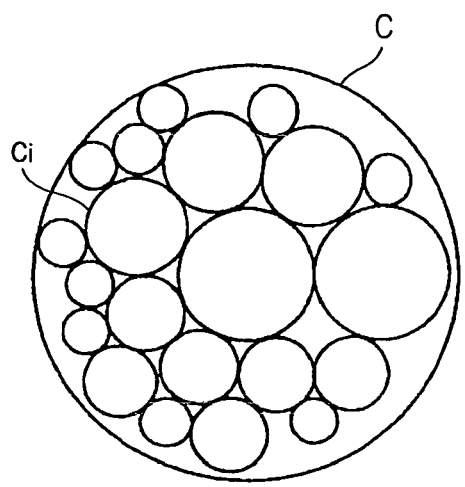
FIG. 3A is a diagram illustrating an initial state.
Figure 3B:
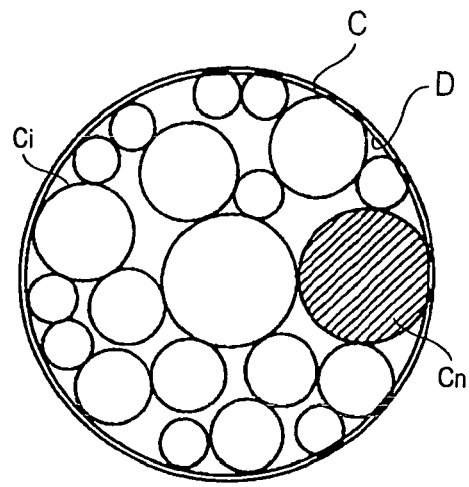
FIG. 3B is a diagram illustrating an insertion trial circle protruding from a target circle.
Figure 3C:
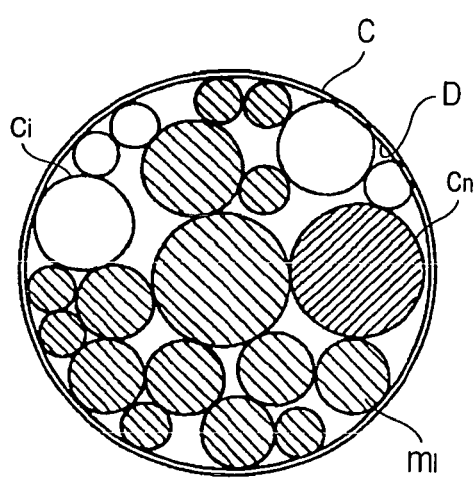
FIG. 3C is a diagram illustrating a state in which the insertion trial circle shown in FIG. 3B is inserted in the target circle.
Figure 3D:
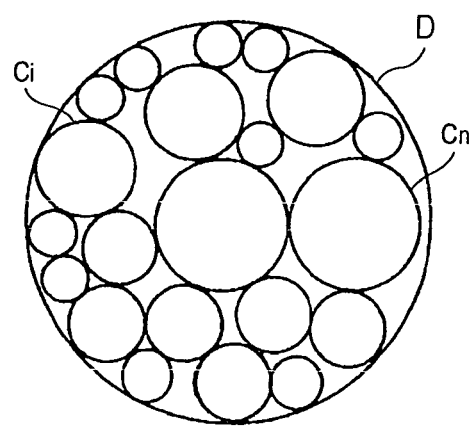
FIG. 3D is a diagram illustrating a final result.

The behavior of the respective circles according to the above-described processing procedure will be shown with reference to FIGS. 3A to 3D. FIGS. 3A to 3D are diagrams illustrating the behavior according to the processing procedure shown in FIG. 2. In particular, FIG. 3A shows an initial state; FIG. 3B shows an insertion trial circle protruding from the target circle; FIG. 3C shows a state in which the insertion trial circle shown in FIG. 3B is inserted in the target circle; and FIG. 3D is a diagram illustrating a final result.

FIG. 3A shows the initial layout of the n circles $c_i$ given as well as the including circle C surrounding them. FIG. 3B shows a state in which processing is underway, and illustrates the target circle D which is slightly smaller than the presently obtained including circle C as well as the insertion trial circle $c_n$ which is one of the circles protruding from this target circle D and whose insertion is tried.

In addition, FIG. 3C shows a state after the search and insertion processing in Step S5 shown in FIG. 2 was carried out with respect to the insertion trial circle $c_n$ shown in FIG. 3B. It should be noted that, in FIG. 3C, circles $m_i$ (a circle set surrounding the coarse hatchings) show a moved circle set which was moved to insert the insertion trial circle $c_n$ in the above-described search and insertion processing. It should be noted that, as can be understood from this drawing, there are cases where the other protruding circles are also packed in the target circle D in the process of the insertion processing of the insertion trial circle $c_n$. Then, the result in which insertion processing was effected with respect to all the protruding circles is shown in FIG. 3D.

Thus, the layout of the plurality of wires making up the wire harness is changed such that they are located as distantly as possible from the wire protruding from the including circle, and the protruding wire is inserted in the space thus created. As this operation is repeatedly calculated, the outside diameter of the wire harness surrounding the plurality of wires is efficiently obtained.

Figure 4:
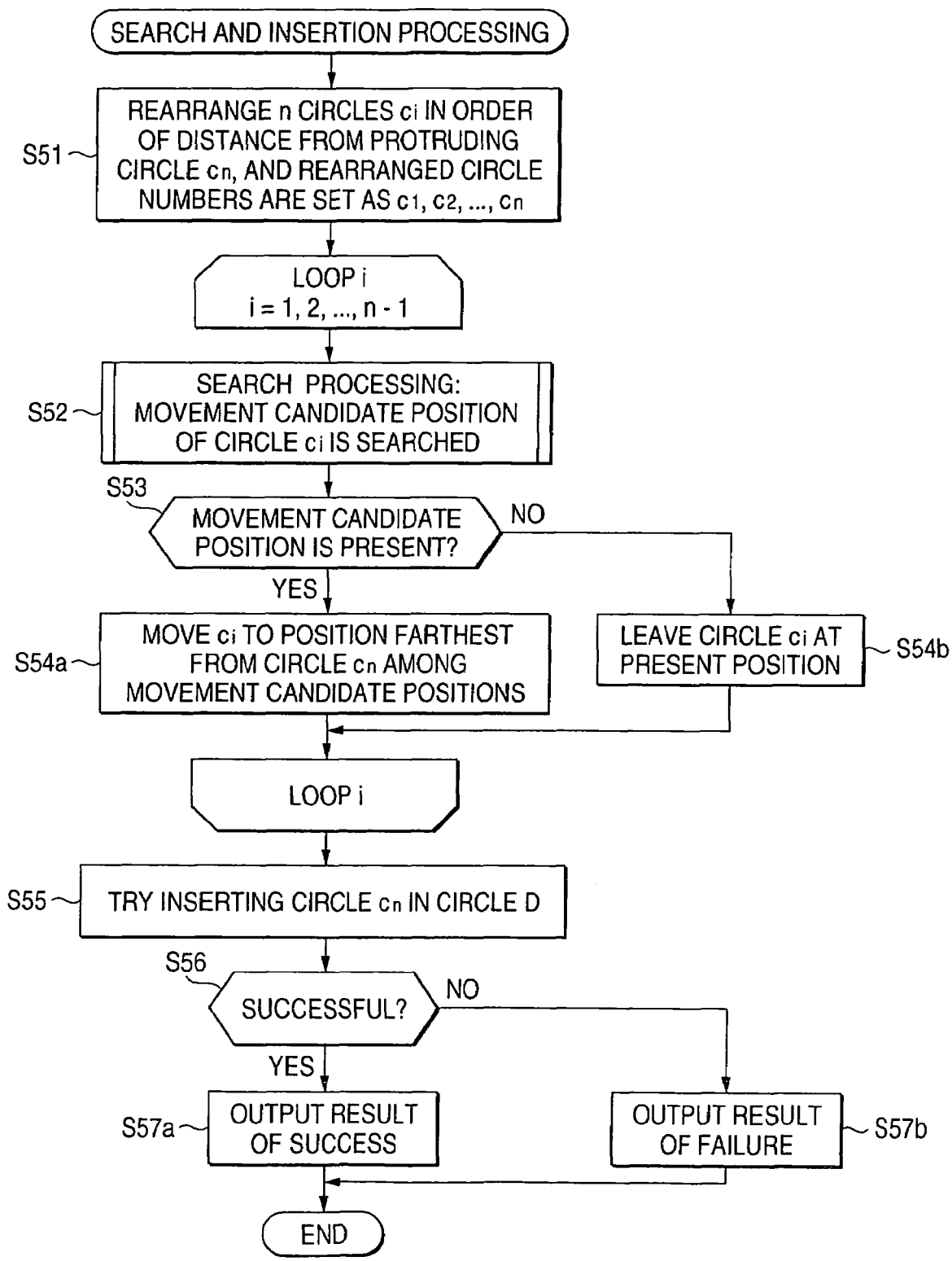
FIG. 4 is a flowchart illustrating search and insertion processing shown in FIG. 2.

Next, referring to FIG. 4, a description will be given of the search and insertion processing in Step S5 shown in FIG. 2 referred to above. FIG. 4 is a flowchart illustrating the search and insertion processing in FIG. 2.

In the search and insertion processing shown in FIG. 4, radii $r_i$ of n circles $c_i$, their centers $(x_i, y_i)$, $i=1, 2, \ldots, n$, and the target circle D are given as input information. It is assumed, however, that the n circles $c_i$ do not overlap each other, and that the final circle $c_n$ protrudes from the target circle D. There may be other protruding circles.

Meanwhile, by way of output information, if the final circle $c_n$ can be inserted in the target circle D without causing the circles already placed in the target circle D to protrude from this target circle D, the central positions of the n circles for realizing that insertion are outputted as a successful result. If that insertion is impossible, a message to that effect is outputted as an unsuccessful result.

First, in Step S51 in the search and insertion processing, the n circles $c_i$ are rearranged in the order of distance from the aforementioned final circle $c_n$. Specifically, this order is based on the distance between the center of each of the n circles $c_i$ and the center of the final circle $c_n$. Here, the circle numbers as the result of the rearrangement are newly set as $c_1$, $c_2, \ldots, c_n$ for the sake of simplicity. It should be noted that this final circle will be hereafter referred to as an insertion trial circle.

Next, processing shown in Steps S52 to S54a (or Step S54b) is effected with respect to i=1, 2, ..., n−1. In Step S52, search processing is carried out. Namely, a search is made of a movement candidate position to which the circle $c_i$ can be moved without overlapping the other circles within the target circle D. Specifically, in this search processing, first search processing shown in FIG. 5 or second search processing shown in FIG. 6 is carried out. In the first search processing, a search is made of such a movement candidate position that the circle $c_i$ becomes farther from the insertion trial circle $c_n$ than the present position of the circle $c_i$ without overlapping the other circles within the target circle D. In addition, in the second search processing shown in FIG. 6, by using the concept of a circle Voronoi diagram, a search is made of a movement candidate position to which the circle $c_i$ can be moved without overlapping the other circles within the target circle D. These searches will be described later.

Then, in Steps S53, S54a, and S54b, if a movement candidate position is present in the above-described search processing (Y in Step S53), the circle $c_i$ is moved to a position which is farthest from the insertion trial circle $c_n$ among such movement candidate positions (Step S54a). If there is no movement candidate position (N in Step S53), the circle $c_i$ is left at the present position (Step S54b). After such processing is effected with respect to i=1, 2, ..., n, the operation proceeds to Step S55. It should be noted that the aforementioned Steps S52 to S54 correspond to the search process in the claims.

Next, in Step S55, the insertion of the insertion trial circle $c_n$ is tried with respect to the space in the target circle D created by the loop processing consisting of the aforementioned Steps S52 to S54a (or Step 54b).

Then in Steps S56, S57a, and S57b, if the insertion is successful by the trial of the insertion (Y in Step S56), the insertion trial circle $c_n$ is moved to that position (Step S57a). If the insertion is not successful (N in Step S56), a message to that effect is outputted (Step S57b). It should be noted that at the time of the success the central positions of the n circles for realizing it are outputted. Then, when the series of processing consisting of Steps S51 to S56a (or Step S56b) is completed, the operation returns to the ensuing processing shown in FIG. 2.

Figure 5:
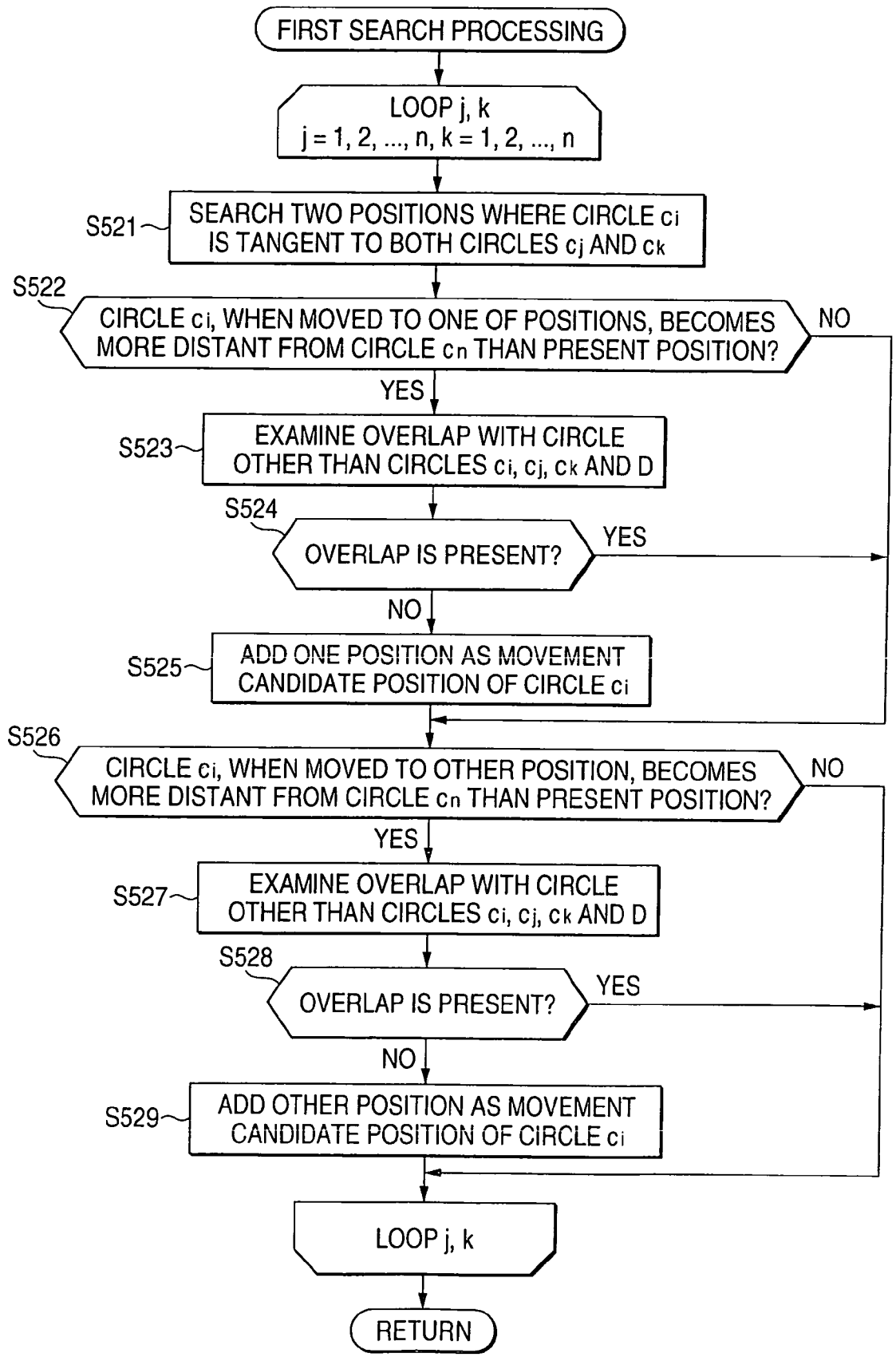
FIG. 5 is a flowchart illustrating first search processing.
Figure 6:
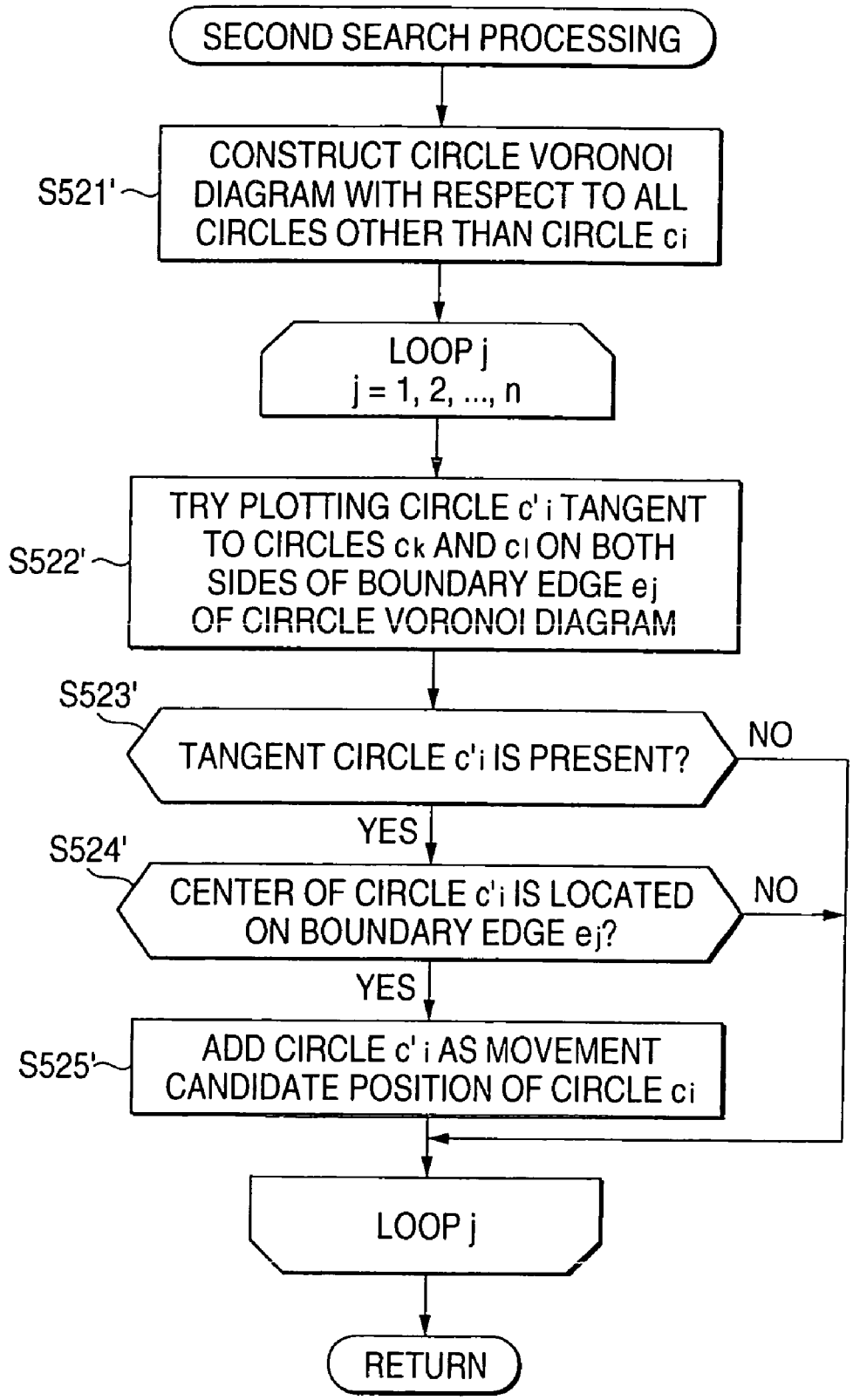
FIG. 6 is a flowchart illustrating second search processing.

Referring to FIGS. 5 and 6, a description will be given of two examples of the above-described search processing. First, the first search processing will be described with reference to FIG. 5. FIG. 5 is a flowchart illustrating the first search processing.

In the first search processing shown in FIG. 5, attention is paid to the fact that that when there is a space for moving the n circles $c_i$, in a state in which the circle $c_i$ is moved to a most distant position from the aforementioned insertion trial circle $c_n$, the circle $c_i$ should be tangent to two circles. However, there are cases where one of these two tangent circles is the aforementioned target circle D. Accordingly, here, a set formed by the whole of the given n circles $c_i$ and the target circle D is set as S={n circles $c_1, c_2, \ldots, c_n$, D}. Then, processing shown in the following Steps S521 to S529 is effected with respect to all the two circles $c_j$ and $c_k$ other than the circle $c_i \in S$.

First, in Step S521, two positions are searched where the circle $c_i$ with a radius $r_i$ is tangent to both the circle $c_j$ and the circle $c_k$. However, it is assumed that if the circle $c_j$ or the circle $c_k$ is a circle other than the target circle D, the circle $c_i$ is tangent to that circle from the outside, and if the circle $c_j$ or the circle $c_k$ is the target circle D, the circle $c_i$ is tangent to that circle from the inside. There are only two such positions, and the centers in such a case are set as $(x'_i, y'_i)$ and $(x''_i, y''_i)$, respectively.

Next, in Step S522, a determination is made as to whether or not if the circle $c_i$ is moved to one of the aforementioned two positions, the circle $c_i$ becomes more distant from the insertion trial circle $c_n$ than the present position. Namely, a comparison is made between a distance X' from one center $(x'_i, y'_i)$ to the center of the insertion trial circle $c_n$ and a distance X from the center of the circle $c_i$ at the present position to the center of the insertion trial circle $c_n$. If the distance X' is greater than the distance X (Y in Step S522), the operation proceeds to Step S523; if not (N in Step S522), the operation proceeds to Step S526 which will be described later.

In Step S523, an examination is made as to whether or not the circle $c_i$ with the radius $r_i$, when placed at the aforementioned center $(x'_i, y'_i)$, overlaps any of all the circles other than the circle $c_i$, the circle $c_j$, the circle $c_k$, and the target circle D. The overlap is determined in Step S524. Here, if it is determined that the circle $c_i$ does not overlap any circle (N in Step S524), the operation proceeds to Step S525. In Step S525, the aforementioned center $(x'_i, y'_i)$ is added as one of the movement candidate positions of the circle $c_i$; otherwise (Y in Step S524), the operation proceeds to Step S526.

Further, the aforementioned center $(x'_i, y'_i)$ is replaced by the other center $(x''_i, y''_i)$, and the following processing in Steps S526 to S529 is effected in the same way as Steps S522 to S525 above. In Step S526, a determination is made as to whether or not if the circle $c_i$ is moved to the other one of the aforementioned two positions, the circle $c_i$ becomes more distant from the insertion trial circle $c_n$ than the present position. Namely, a comparison is made between a distance X" from the other center $(x''_i, y''_i)$ to the center of the insertion trial circle $c_n$ and the distance X from the center of the circle $c_i$ at the present position to the center of the insertion trial circle $c_n$. If the distance X" is greater than the distance X (Y in Step S526), the operation proceeds to Step S527; if not (N in Step S526), the operation proceeds directly to a next one in the loop.

In Step S527, an examination is made as to whether or not the circle $c_i$ with the radius $r_i$, when placed at the aforementioned center $(x''_i, y''_i)$, overlaps any of all the circles other than the circle $c_i$, the circle $c_j$, the circle $c_k$, and the target circle D. The overlap is determined in Step S528. Here, if it is determined that the circle $c_i$ does not overlap any circle (N in Step S528), the operation proceeds to Step S529. In Step S529, the aforementioned center $(x''_i, y''_i)$ is added as one of the movement candidate positions of the circle $c_i$; otherwise (Y in Step S528), the operation directly proceeds to a next one in the loop. When such processing is effected with respect to all the two circles $c_j$ and $c_k$ other than the circle $c_i$, the operation returns to the immediately following processing shown in FIG. 4.

Figure 8A:
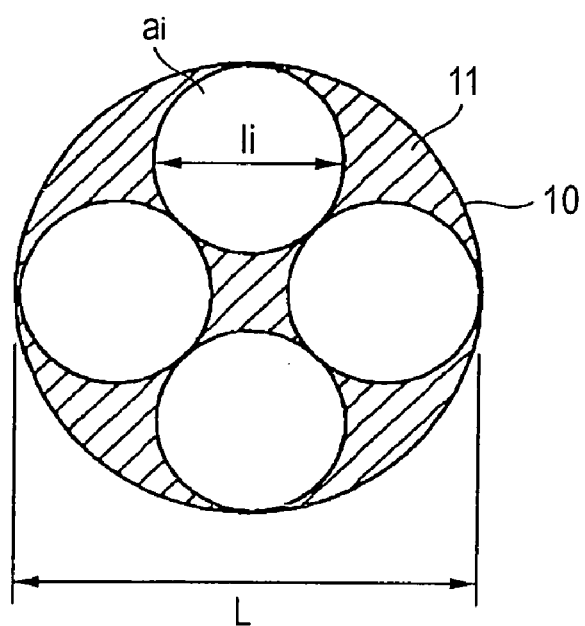
FIG. 8A is a diagram illustrating a wire harness which is made up of a relatively small number of wires.
Figure 8B:
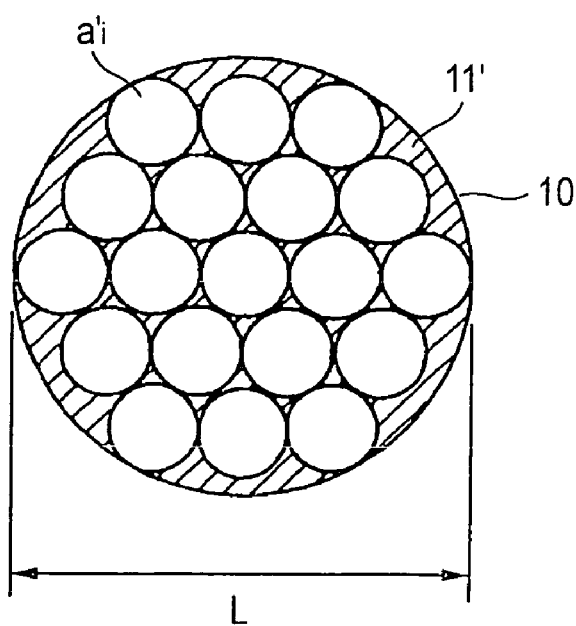
FIG. 8B is a diagram illustrating a wire harness which is made up of a relatively large number of wires.

By using the above-described first search processing, the calculation of the outside diameter of the wire harness, which is conventionally performed by the method shown in FIG. 8 or by experience, can be improved and performed more accurately. Accordingly, an aid is provided in the design of the wire harness. On the other hand, there arises a problem in that if the first search processing is used, the amount of calculation becomes enormously large. Namely, in the first search processing shown in FIG. 5 referred to above, since the above-described operation is effected with respect to the set of the circle $c_i$, the circle $c_j$, and the circle $c_k$, the calculation time becomes $O(n^3)$. In the search and insertion processing shown in FIG. 4, since the processing is effected with respect to all of I=1, 2, ..., n, the calculation time becomes $O(n^4)$. Further, in the processing shown in FIG. 2, since processing is effected repeatedly by incorporating the processing shown in FIG. 4, the total amount of calculation becomes enormously large. Improvement is made in this respect in the second search processing shown in FIG. 6 below.

Figure 7A:
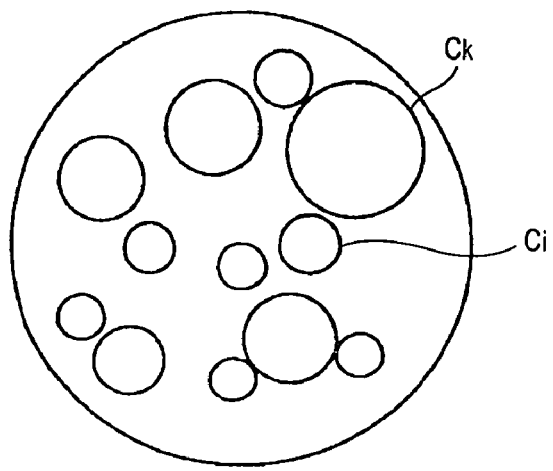
FIG. 7A is a diagram illustrating an example of a circle set.
Figure 7B:
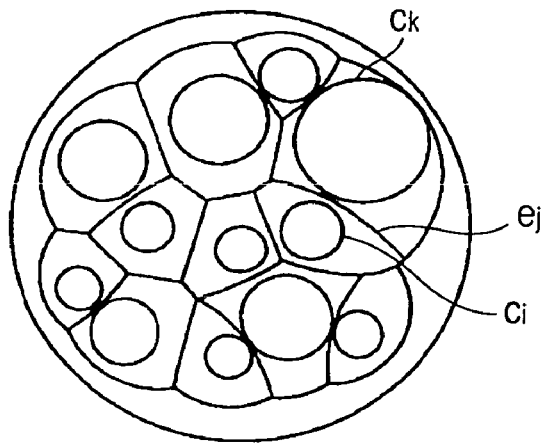
FIGS. 7B and 7C are a circle Voronoi diagram and a Laguerre circle Voronoi diagram, respectively, with respect to the circle set shown in FIG. 7A.
Figure 7C:
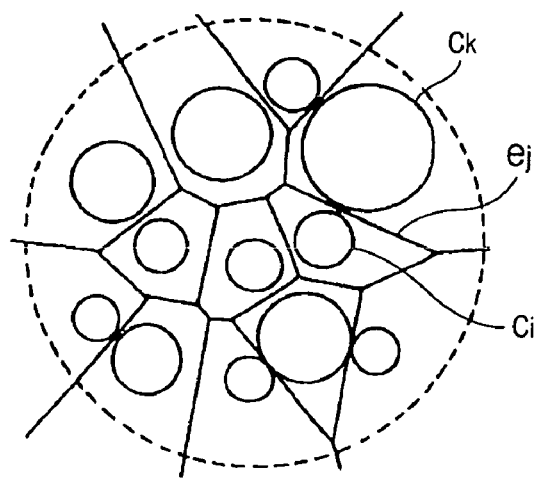

FIG. 6 is a flowchart illustrating the second search processing. FIG. 7A is a diagram illustrating an example of a circle, set. FIGS. 7B and 7C are a circle Voronoi diagram and a Laguerre circle Voronoi diagram, respectively, with respect to the circle set shown in FIG. 7A.

First, a basic concept of this second search processing will be shown. In this second search processing, the search of a movement candidate position of an insertion trial circle $c_i$ is made efficient by using the concept of a known Voronoi diagram. Namely, in the above-described first search processing, positions where the circle $c_i$ is tangent to all sets of circles $c_j$ and $c_k$ are determined. However, if the concept of the Voronoi diagram is utilized, the candidates can be limited.

When a finite number of circles not overlapping each other in a plane are given, the plane can be divided by determining to which circle a given circle is closest. This divided diagram is called a circle Voronoi diagram. This circle Voronoi diagram is also shown in document 1 (A. Okabe, B. Boots, K. Sugihara and S. N. Choi: Spatial Tessellations—Concepts and Applications of Voronoi Diagrams, 2nd Edition. John Wiley and Sons, Chichester, 2000).

For example, a circle Voronoi diagram with respect to a circle set shown in FIG. 7A is shown in FIG. 7B. A point on a boundary edge $e_j$ which is called a Voronoi edge in FIG. 7B has a characteristic that the point is equidistanced from two circles $c_k$ and $c_l$ and the other circles are located more distantly. Accordingly, a circle which is tangent to the two circles $c_k$ and $c_l$ and does not overlap other circles has a center on the boundary edge $e_j$ of the circle Voronoi diagram. Accordingly, as for the movement candidate positions of the circle $c_i$, it suffices to search only the sets of two circles $c_k$ and $c_l$ sandwiching the boundary edge $e_j$ of the circle Voronoi diagram. Since the number of the boundary edges $e_j$ of the circle Voronoi diagram of n circles is proportional to n, the calculation time of the sets of the circles $c_k$ and $c_l$ to be searched is $O(n^2)$ in the first search processing shown in FIG. 5 referred to above, whereas the calculation time of the sets of the circles $c_k$ and $c_l$ to be searched is $O(n)$ in this case.

Further, in the first search processing shown in FIG. 5 referred to above, a search is made of the overlap with all the circles $c_j$ and $c_k$ other than the circle $c_i$ with respect to the movement candidate positions of the circle $c_i$ tangent to the two circles $c_k$ and $c_l$. Here, however, that search is made unnecessary. Namely, it is sufficient if a search is made as to whether or not the movement candidate positions of the circles $c_i$ are located on the boundary edges $e_j$. This is because it can be derived from the characteristic of the Voronoi diagram that if the circle $c_i$ is located on the boundary edge $e_j$, the circle $c_i$ does not overlap another circle, and if the circle $c_i$ is not located on the boundary edge $e_j$, the circle $c_i$ overlaps another circle. Accordingly, the calculation time of $O(n)$ can be reduced to $O(1)$.

The processing procedure of the second search processing based on such a concept is shown in FIG. 6 referred to below. In Step S521' in FIG. 6, a circle Voronoi diagram is constructed with respect to the aforementioned circle set $S—\{c_i\}$, i.e., all the circles other than the circle $c_i$. Here, since the circle set $S—\{c_i\}$ consists of n circles, the number of boundary edges is also proportional to n.

Then, processing in the following Steps S522' to S525' is performed with respect to each boundary edge $e_j$ (j=1, 2, ..., n).

In Step S522', a circle c'i with a radius $r_i$ tangent to the circles $c_k$ and $c_l$ on both sides of the boundary edge $e_j$ is plotted. Here again, it is assumed that if the circle $c_k$ or the circle $c_l$ is a circle other than the target circle D, the circle $c'_i$ is tangent to that circle from the outside, and if the circle $c_k$ or the circle $c_l$ is the target circle D, the circle $c'_i$ is tangent to that circle from the inside. Incidentally, there are only two such positions.

Next, if it is determined in Step S523' that the above-described tangent circle $c'_i$ with the radius $r_i$ is present (Y in Step S523'), and if it is determined in Step S524' that its center is located on the boundary edge $e_j$ (Y in Step S524'), the operation proceeds to Step S525' to add this circle $c'_i$ as the movement candidate position of the circle $c_i$. Otherwise (N in Step S523' and N in Step S524'), the operation proceeds directly to the next step. If such processing is effected with respect to all the boundary edges $e_j$, the operation returns to the following processing shown in FIG. 4.

As is apparent from the foregoing description, it can be appreciated that the search of movement candidate positions of the circles $c_i$ can be extremely simplified by utilizing the concept of the Voronoi diagram. The aforementioned document 1 shows that a circle Voronoi diagram of n circles can be constructed in the calculation time of O (nlogn). Accordingly, the processing of the aforementioned Step S521' can be executed in O (nlogn). Meanwhile, since the number of the boundary edges of the circle Voronoi diagram of the n circles is only proportional to n, the processing of the aforementioned Steps S522' to S524' can be executed in O (n) time. It follows from above that the calculation time of the second search processing shown in FIG. 6 becomes O (nlogn). By way of reference, since the calculation time of O ($n^3$) is required in the first search processing shown in FIG. 5, it can be seen that the efficiency improves substantially. Incidentally, if the second search processing in FIG. 6 is incorporated into the search and insertion processing in FIG. 4, since the processing in FIG. 6 is executed O (n) times in the search and insertion processing in FIG. 4, the calculation time of the search and insertion processing in FIG. 4 becomes O ($n^2$logn).

It should be noted that a simple method of calculating the above-described circle Voronoi diagram is a method in which a Laguerre Voronoi diagram described in the aforementioned document 1 is constructed, and is then converted into a circle Voronoi diagram by the flip operation of a side described in document 2 (D. S. Kim and K. Sugihara: Voronoi diagram of a circle set from Voronoi diagram of a point set, I. Topology. Computer Aided Geometric Design, vol. 18 (2001), pp. 541-562) and document 3 (D. S. Kim and K. Sugihara: Voronoi diagram of a circle set from Voronoi diagram of a point set, II. Geometry. Computer Aided Geometric Design, vol. 18 (2001), pp. 563-585).

As described above, according to this embodiment, the outside diameter of the wire harness surrounding the plurality of wires can be efficiently obtained by repeatedly calculating the operation in which the layout of the plurality of wires making up the wire harness is changed such that, by using a computer, the wires are moved as distantly as possible from the wire protruding from the including circle, and the protruding wire is inserted in the space thus created. In particular, by adopting the concept of the circular Voronoi diagram, it becomes possible to obtain the outside diameter of the wire harness extremely simply and in a short time.

It should be noted that, in the above-described embodiment, the radius is outputted to determine the outside diameter of the wire harness, but it goes without saying that the diameter may be outputted instead. In addition, an arrangement may be provided such that not only is the radius of the wire harness outputted in the above-described manner, but information indicating the layout of the respective wires is outputted. In addition, the values of p and □ are not limited to the values shown in the above-described embodiment, and may be modified, as required, within the scope of the gist of the invention.

In accordance with the first aspect of the invention, the including circle surrounding the plurality of wires is made gradually small by repeatedly executing the target-circle defining step, the searching step, the inserting step, and the first search controlling step by using a computer. Consequently, the outside diameter of the circle surrounding the plurality of wires can be obtained efficiently.

In accordance with the second aspect of the invention, the search of movement candidate positions of the insertion trial circle is extremely simplified by making use of a circle Voronoi diagram. Accordingly, the outside diameter of the circle surrounding the plurality of wires can be obtained in a short time.

In accordance with the third aspect of the invention, a second search controlling step is further comprised in which in a case where the insertion of the insertion trial circle is impossible, the operation returns to the searching step after determining a new target circle which is of an intermediate size between the including circle and the present target circle. Consequently, the outside diameter of the circle surrounding the plurality of wires can be obtained more efficiently.

In accordance with the fourth aspect of the invention, initial information on the plurality of wires is inputted by the input means, the including circle surrounding the plurality of wires is made gradually small by the target-circle defining means, the searching means, the inserting means, and the first search controlling means, and the outside diameter of that including circle is outputted by the output means. Consequently, the outside diameter of the circle surrounding the plurality of wires can be obtained efficiently.

According to the fifth aspect of the invention, since the position information on the including circle and the plurality of circles is outputted, the outside diameter of the circle surrounding them, including the layout of the plurality of wires, can be obtained efficiently.

In accordance with the sixth aspect of the invention, the search of movement candidate positions of the insertion trial circle is extremely simplified by making use of a circle Voronoi diagram by the second searching means. Accordingly, the outside diameter of the circle surrounding the plurality of wires can be obtained in a short time.

In accordance with the seventh aspect of the invention, in a case where the insertion of the insertion trial circle by the second search controlling means is impossible, the search by the searching means is effected again after determining a target circle which is of an intermediate size between the including circle and the present target circle. Therefore, the outside diameter of the circle surrounding the plurality of wires can be obtained more efficiently.

The invention claimed is:

1. A computer implemented method of calculating an outer diameter of a wire packing which is formed by bundling and packing a plurality of wires into a smallest possible circular shape so as not to overlap each other, the method comprising:

an including-circle assuming step of assuming an including circle which includes a plurality of circles arranged in a plane so as not to over lap each other by assuming that cross-sectional shapes of the plurality of wires are the plurality of circles having diameters corresponding to respective outer shapes thereof;

a target-circle defining step of determining a target circle which has the same center as that of the including circle and is slightly smaller than the including circle, and from which at least one of the plurality of circles protrudes;

a searching step of setting the circle protruding from the target circle as insertion trial circle, and searching positions to which the plurality of circles other than the insertion trial circle can be moved as distantly as possible within the target circle without overlapping each other; and an inserting step of inserting the insertion trial circle in a space in the target circle created by changing a layout of the plurality of circles on the basis of a result of search in the searching step, wherein, if the insertion trial circle is successfully inserted in the space in the target circle during the inserting step, the method further comprises:

a first search controlling step of setting a new target circle which is slightly smaller than the target circle, wherein at least one of the plurality of circles protrudes from the new target circle;

setting the new target circle as the target circle; and returning to and executing the searching step, and wherein, if the insertion trial circle is not successfully inserted in the space in the target circle during the inserting step, the method further comprises outputting at least the outside diameter of the including circle.

2. The computer implemented method according to claim 1, wherein, in the searching step, a circle Voronoi diagram is constructed by a circle set excluding the insertion trial circle and one of the plurality of circles, and the target circle, and an examination is made with respect to the plurality of circles other than the insertion trial circle as to whether or not a center of the one circle tangent to both side circles forming each of boundary edges in the circle Voronoi diagram is located on the boundary edge, to thereby search positions to which the circles can be moved within the target circle.

3. The computer implemented method according to claim 1 further comprising:

a second search controlling step of determining a new target circle which is of an intermediate size between the including circle and the target circle if the insertion trial circle is not successfully inserted in the space in the target circle during the inserting step, and executing the searching step and the inserting step while setting the new target circle as the target circle.

4. An apparatus for calculating an outside diameter of a wire packing which is formed by bundling and packing a plurality of wires into the smallest possible circular shape so as not to overlap each other, the apparatus comprising:

input means for inputting initial information concerning the plurality of wires, including-circle assuming means for assuming an including circle which includes a plurality of circles arranged in a plane so as not to overlap each other by assuming that cross-sectional shapes of the plurality of wires are the plurality of circles having diameters corresponding to respective outer shapes thereof;

target-circle defining means for determining a target circle which has the same center as that of the including circle and is slightly smaller than the including circle, and from which at least one of the plurality of circles protrudes;

searching means in which the circle protruding from the target circle is set as an insertion trial circle, and positions are searched to which the plurality of circles other than the insertion trial circle can be moved as distantly as possible within the target circle without overlapping each other;

inserting means for inserting the insertion trial circle in a space in the target circle created by changing the layout of the plurality of circles on the basis of a result of search by the searching means; and wherein, in a case where the insertion trial circle is successfully inserted in the target circle, the apparatus further comprises:

first search controlling means in which a new target circle which is slightly smaller than the target circle is set, wherein at least one of the plurality of circles protrudes from the new target circle, wherein the new target circle is set as the target circle, and wherein control is returned to the searching means which executes the search, and wherein, in a case where the insertion trial circle is not successfully inserted in the target circle, the apparatus further comprises output means for outputting at least the outside diameter of the including circle.

5. The apparatus according to claim 4, wherein the output means outputs position information on the including circle and the plurality of circles.

6. The apparatus according to claim 4 or 5, wherein the searching means includes second searching means in which a circle Voronoi diagram is constructed by a circle set excluding the insertion trial circle and one of the plurality of circles, and the target circle, and in which an examination is made with respect to the plurality of circles other than the insertion trial circle as to whether or not a center of the one circle tangent to both side circles forming each of boundary edges in the circle Voronoi diagram is located on the boundary edge, to thereby search positions to which the circles can be moved within the target circle.

7. The apparatus according to claim 4, further comprising: second search controlling means which, in a case where the insertion trial circle is not successfully inserted in the target circle, determines a new target circle which is of an intermediate size between the including circle and the target circle and the search by the searching means is effected while setting the new target circle as the target circle.

8. A computer readable recording medium storing computer executable instructions for executing a method for calculating an outside diameter of a wire packing which is formed by bundling and packing a plurality of wires into the smallest possible circular shape so as not to overlap each other, said method comprising:

an input step of inputting initial information concerning the plurality of wires, an including-circle assuming step of assuming an including circle which includes a plurality of circles arranged in a plane so as not to overlap each other by assuming that cross-sectional shapes of the plurality of wires are the plurality of circles having diameters corresponding to respective outer shapes thereof;

a target-circle defining step of determining a target circle which has the same center as that of the including circle and is slightly smaller than the including circle, and from which at least one of the plurality of circles protrudes;

a searching step in which the circle protruding from the target circle is set as an insertion trial circle, and positions are searched to which the plurality of circles other than the insertion trial circle can be moved as distantly as possible within the target circle without overlapping each other;

an inserting step of inserting the insertion trial circle in a space in the target circle created by changing the layout of the plurality of circles on the basis of a result of search by the searching means; and wherein, in a case where the insertion trial circle is successfully inserted in the target circle in the inserting step, the method further comprises:

a first search controlling step in which a new target circle which is slightly smaller than the target circle is set, wherein at least one of the plurality of circles protrudes from the new target circle;

setting the new target circle as the target circle; and returning and executing the searching step, wherein, in a case where the insertion trial circle is not successfully inserted in the target circle, the method further comprises an output step of outputting at least the outside diameter of the including circle.

* * * * *